(12) United States Patent
Buda

(10) Patent No.: US 6,978,227 B2
(45) Date of Patent: Dec. 20, 2005

(54) PROGRAMMABLE LOGIC CONTROLLER WITH PROGRAMMABLE HIGH-SPEED DIGITAL PROCESSING

(75) Inventor: Paul R. Buda, Raleigh, NC (US)

(73) Assignee: Schneider Automation Inc., North Andover, MA (US)

( * ) Notice: Subject to any disclaimer, the term of this patent is extended or adjusted under 35 U.S.C. 154(b) by 215 days.

(21) Appl. No.: 10/121,943

(22) Filed: Apr. 12, 2002

(65) Prior Publication Data

US 2003/0195722 A1 Oct. 16, 2003

(51) Int. Cl.[7] .......................... G06F 11/30; G05B 11/01
(52) U.S. Cl. .......................... 702/184; 702/183; 700/12
(58) Field of Search .......................... 702/184, 60, 183, 702/186; 710/5, 12; 700/5, 12

(56) References Cited

U.S. PATENT DOCUMENTS

| | | | | |
|---|---|---|---|---|
| 5,345,409 A | * | 9/1994 | McGrath et al. | .............. 702/60 |
| 6,249,237 B1 | * | 6/2001 | Prater | .......................... 341/143 |

FOREIGN PATENT DOCUMENTS

| | | |
|---|---|---|
| WO | WO 00/55697 | 9/2000 |
| WO | WO 01/50704 | 7/2001 |

OTHER PUBLICATIONS

WO 2003/087960 International Search Report; mail date Aug. 17, 2004.
Dimitri, S.D.; "High Performance DSP Based Motion Control for PLC's with VME Architecture"; *Industrial Computing Society and Instrument Society of America; Proceedings of the Industrial Computing Conference*, vol. 1; pp. 215–237; Oct. 27, 1991.

Anonymous; "4–Channel Analog Converter Board"; *Internet Article*, ACC–28A–Delta Tau Data Systems, Inc.–CGDM, MM; XP–002291104, retreival date Aug. 3, 2004.

Anonymous; Digital Signal Processor Control Board DS200DSPCG__A__; *Internet Article*, GEI–100220, GE Motors & Industrial Systems; pp1–11; XP002291105, retrieval date Aug. 3, 2004.

* cited by examiner

*Primary Examiner*—John Barlow
*Assistant Examiner*—Meagan S Walling

(57) ABSTRACT

High-speed programmable logic controller (PLC) signal processing is accomplished using a programmable signal processing arrangement that is capable of altering characteristics of signal processing in response to one or more signal processing coefficients. According to an example embodiment of the present invention, a PLC-based arrangement includes a PLC controller and a signal processing arrangement that oversamples and processes a signal at a frequency that is greater than a maximum input-process-output scan rate of the PLC controller. In one implementation, the signal processing arrangement is programmable with complex high-speed signal processing parameters that can be downloaded, for example, via the Internet in response to an end-user request. With these approaches, signal sampling and processing is achieved with a PLC-based system at a rate that can be much higher than previously-available signal processing rates with PLC controllers.

19 Claims, 4 Drawing Sheets

PROGRAMMABLE LOGIC CONTROLLER WITH PROGRAMMABLE HIGH-SPEED DIGITAL PROCESSING

FIELD OF THE INVENTION

The present invention is directed to electronic signal processing and, more particularly, to programmable logic controllers (PLCs) that employ high-speed signal processing.

BACKGROUND

A variety of industrial, commercial and other applications employ PLCs that process signals (e.g., analog and/or digital signals) in order to provide an output signal with selected characteristics. In typical PLC applications, a variety of input and output (I/O) signals, including analog signals, are processed using addressable I/O modules communicatively coupled to a processor. When performing operations using the input signals, it is sometimes necessary to communicate over one or more data busses and/or over one or more of the I/O modules. For instance, input signals received at the PLC are sometimes sent to external devices that process those signals and send output signals back to the PLC.

In some instances, such as monitoring temperature or motion, PLCs are programmed to process signals internally. Such approaches used with PLCs commonly involve performing relatively simple mathematical operations on signals received at an input module. With analog input signals, an analog-to-digital converter (ADC) can be to convert an analog input signal to a digital signal, and the converted digital signal is communicated over a communications link to a microprocessor where the mathematical operations are carried out. These approaches are limited in that the operations are performed after the PLC collects all the pertinent data or in a timeframe that permits the PLC to operate at its relatively slow pace due to access time limitations. For instance, typical input-process-output scan rates of PLCs are less than about 1–2 kHz. Furthermore, more complex operations are typically not carried out by PLCs due to versatility needs (e.g., limitations in the education of the PLC operators and/or due to various performance-based limitations that are inherent to PLCs).

These and other considerations have presented challenges to the implementation of PLCs to more complex applications such as high-speed, real-time digital signal processing and various types of filtering.

SUMMARY

The present invention is directed to overcoming the above-mentioned challenges and others related to the types of devices and applications discussed above and in other filtering applications. The present invention is exemplified in a number of implementations and applications, some of which are summarized below.

According to an example embodiment of the present invention, a PLC-based arrangement includes PLC-processor and a programmable digital signal processor (DSP) circuit for high-speed signal processing. The DSP circuit is programmable using, for example, a program memory that can be programmed via the PLC-processor. The DSP circuit oversamples and processes signals at a rate that is greater than a maximum scan (input-process-output) rate of the PLC-processor. With this approach, high-speed sampling of an input signal (e.g., an analog signal converted to a digital signal) is effected with a highly-flexible programmable PLC-based arrangement in a manner that facilitates complex signal sampling and processing at a rate higher than PLC-processor scan rates.

In another example embodiment of the present invention, the programmable DSP circuit in the example embodiment discussed above uses programming downloaded from an external source to carry out mathematical operations on input data. With this approach, the programmable DSP circuit can be selectively programmed with highly-complex remotely-downloaded programs, which is particularly useful for end-users wishing to tailor the PLC-based arrangement to a particular application without necessarily having to understand complex signal processing parameters and concepts.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention in connection with the accompanying drawings, in which.

Figure 1:
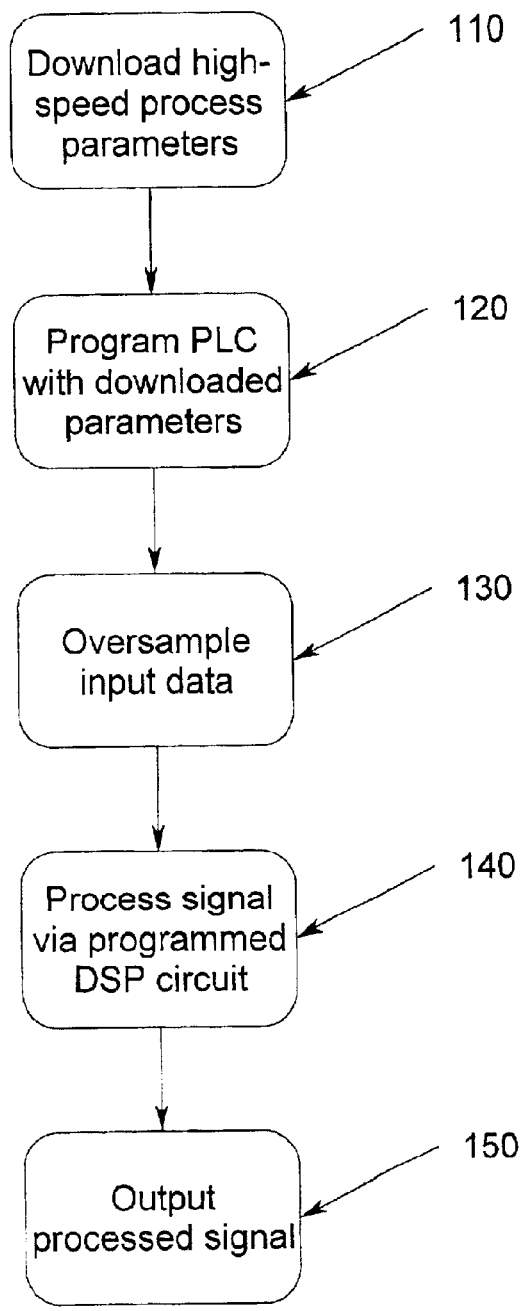
FIG. 1 is a process diagram for processing a signal in a PLC-based arrangement, according to an example embodiment of the present invention.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of high-speed signal processing applications, and has been found to be particularly useful for digital signal processing applications with programmable logic controllers (PLCs) that employ filtering parameters for attenuating, truncating and/or otherwise altering selected signal components (e.g., noise). For instance, example embodiments of the present invention are applicable for band pass, notch, anti-aliasing, low pass and high pass filtering applications. While the present invention is not necessarily limited to such applications, various aspects of the invention may be appreciated through a discussion of various examples using this context.

According to an example embodiment of the present invention, a PLC-based arrangement includes DSP-based circuitry that is configured and arranged to oversample and process an input signal at a rate that is greater than a maximum scan rate of a processor of the PLC. The PLC-based arrangement includes a plurality of input/output (I/O) nodes, a programmable PLC-processor circuit and programmable signal processing circuitry that includes a DSP circuit. The programmable PLC-processor circuit controls the PLC in response to user-defined tasks and exhibits an input-process-output cycle in which input signals at the I/O nodes are scanned and processed to provide an output at the nodes, with the input-process-output cycle being repeated at a rate that does not exceed a maximum scan rate. The programmable signal processing circuitry oversamples and process the input signals at the nodes at a rate that is greater than the maximum scan rate. The oversampled and processed input signals can then be supplied to the programmable PLC-processor circuit for use in a variety of implementations. With this approach, PLC-based applications can be implemented with scan rates that are faster than the maximum scan rate, and in some instances, approach and/or exceed 10–50 kHz.

According to another example embodiment of the present invention, a signal filtering arrangement including a DSP circuit is programmed using one or more downloaded parameters, such as filtering coefficients, sampling rates and tap numbers, to filter a digital signal. The downloaded parameter(s) may, for example, include parameters selected to achieve one or more of a variety of types of filtering. Filtering characteristics such as high pass, low pass, band pass and notch filtering can be achieved via the selection of the filtering parameters. The ability to download filtering coefficients to a PLC is particularly useful, for example, for programming the filtering circuit to exhibit different filtering characteristics for different applications.

According to another example embodiment of the present invention, filtering circuits used in PLC applications are readily programmed for a variety of signal filtering implementations, making the application of the PLCs highly flexible. For instance, applications to which the present invention is applicable include: high-speed near or actual real-time process control such as motion, temperature, flow, pressure and electrical control; data acquisition; image display; and others. In these and other applications, filtering parameters such as the sampling rate, the tap number and filter coefficients used in multiplication algorithms are specifically tailored to the application via the downloaded PLC programming. For specific examples of high-speed real-time signal processing with a PLC, reference may be made to U.S. patent application Ser. No. 10/121,445, entitled "Apparatus and Method for Arc Detection," filed concurrently herewith, which is fully incorporated herein by reference, with particular reference to the DSP arrangement in FIG. 6 and related figures and corresponding discussion, as well as alterations thereof.

FIG. 1 is a process diagram for processing a signal in a PLC-based arrangement, according to another example embodiment of the present invention. The PLC-based arrangement includes a PLC-processor that exhibits a maximum scan rate for performing input-process-output cycles on signals received at an input port (e.g., for process control). High-speed DSP parameters such as mathematical coefficients, tap number and sampling rate are downloaded at block 110. The PLC-based arrangement is programmed with the downloaded parameters at block 120, and input data is sampled at block 130 at a rate that is higher than the maximum scan rate using high-speed sampling circuitry. The input data may, for example, include data from a sensor or other type of information-gathering device. The sampling at block 130 is controlled in response to sample rate information received during the download at block 110 and may, for example, include an oversampling rate of sampling. In one implementation, where the maximum scan rate of the PLC-processor is between about 1–2 kHz, the oversampling rate is about twice as fast as the maximum scan rate and in other implementations, the oversampling rate is between about 10 Khz and 50 kHz. The input data is processed using programmed DSP circuitry in a PLC-based arrangement at block 140, with the DSP circuitry being programmed using the information including that downloaded at block 110. The signal processing may, for example, include averaging a plurality of input samples, with one or more of a variety of mathematical filtering operations being performed on the input samples. Once the signals have been processed, a processed signal is output at block 150.

Figure 2:
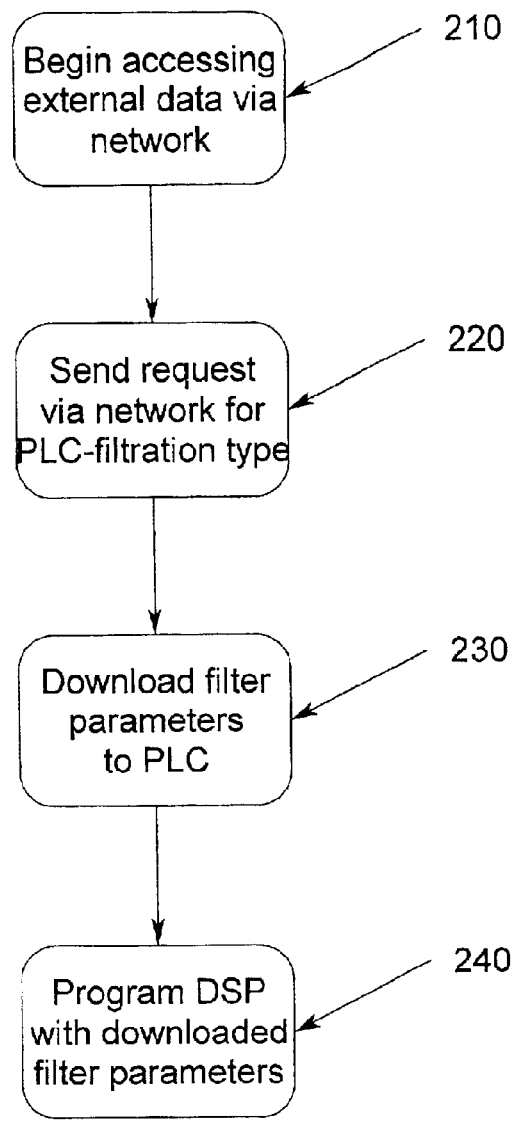
FIG. 2 is another process diagram for filtering a signal in a PLC, according to another example embodiment of the present invention.

FIG. 2 is a process diagram for programming a PLC-based arrangement with a DSP for high-speed, real-time signal filtering, according to another example embodiment of the present invention. At block 210, external data access is initiated via a network. This access can be effected in one or more of a variety of manners. For instance, a user coupled to a PLC and to the network via a user interface can initiate a request at block 220 for a particular PLC-filtration type, such as for filtering a process feedback signal or for filtering out a particular frequency of an input signal. In an alternate implementation, the PLC is programmed to automatically initiate the request at block 220 in response to an input to the PLC calling for a particular type of filtering.

The request for PLC-filtration type is received, for example, at a remote network server, and complex filtering parameters corresponding to the PLC-filtration type are downloaded to the PLC at block 230. The complex filtering parameters may, for instance, include parameters such as those relating to filter coefficients, sampling rates, mathematical algorithms and tap numbers. The downloaded filtering parameters are stored at the PLC in a memory, and in one implementation, are stored at a particular DSP-filtering circuit. At block 240, a DSP is programmed with the downloaded high-speed filtering parameters. Once the programming is complete, the DSP can be used for high-speed, near or at real-time filtering of an input signal to the PLC with oversampling, such as discussed above in connection with FIG. 1.

Figure 3:
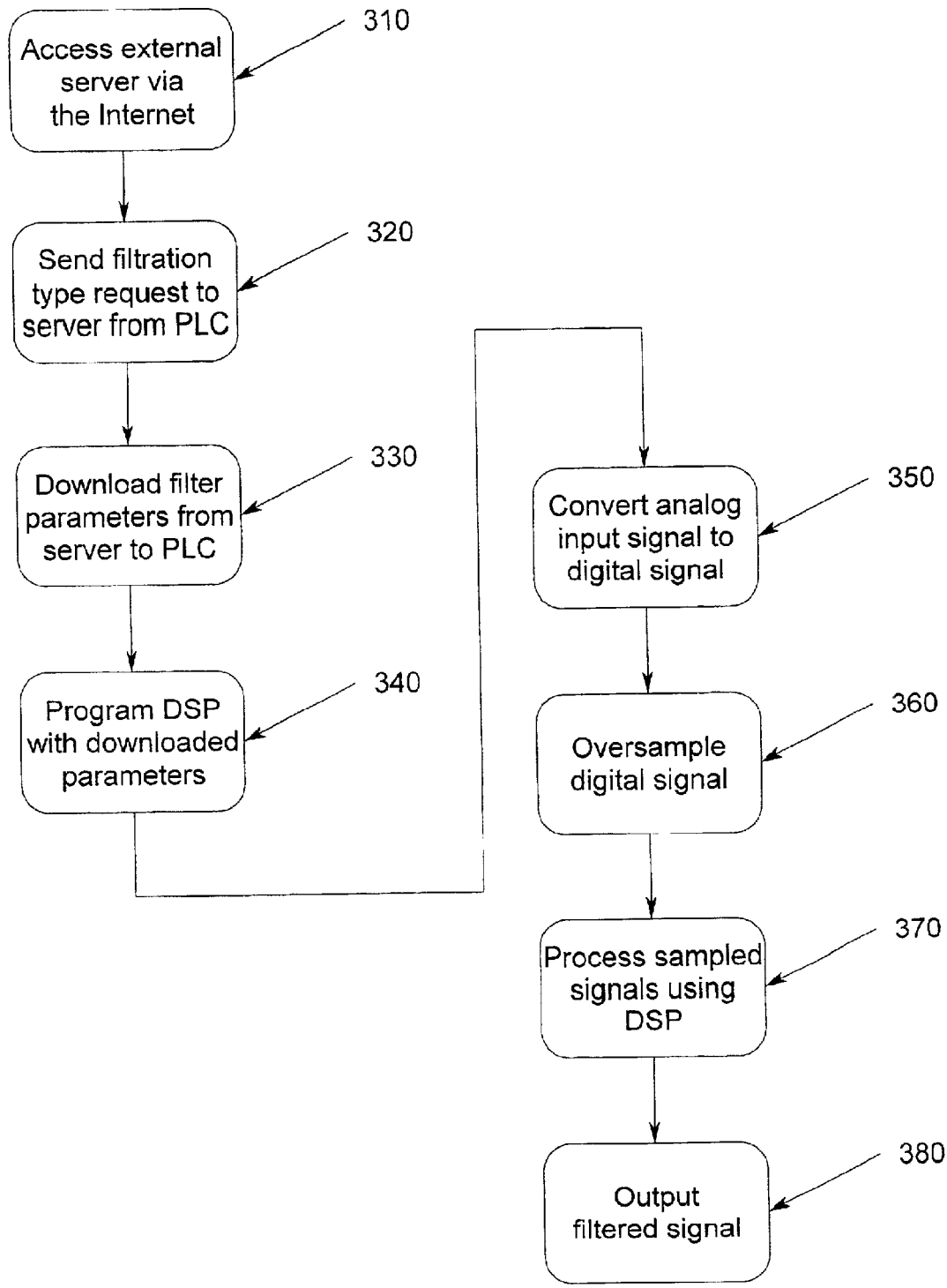
FIG. 3 is a process diagram for filtering an analog signal with a PLC, according to another example embodiment of the present invention.

FIG. 3 is a process diagram for high-speed filtering of an analog signal with a programmable DSP-based PLC filtering arrangement and an Internet-based server, according to another example embodiment of the present invention. At block 310, an external server is accessed via the Internet using an Internet-based interface coupled to a PLC processor having a maximum scan rate as discussed above, and PLC-filtration type request is sent to the server at block 320. The external server may, for example, have a user-friendly web page that displays PLC-filtering selections, such as for a particular type of filtering process and/or for making specific program-level control selections, such as for tap number, mathematical filtering coefficients and/or sampling rate. In one implementation, the web page includes selection information relating to the type of output response that is desired (e.g., to provide an output that has selected control characteristics, such as gain and other characteristics).

In response to the request sent at block 320, complex high-speed filtering parameters are downloaded from the server to the PLC at block 330. The download to the PLC is made via one or more of a variety of Internet access appliances, such as a computer, coupled to the PLC. The downloaded high-speed filter parameters are communicated in the PLC to memory storage circuitry accessible by a DSP filter coupled to the PLC, and the DSP is programmed using the downloaded parameters at block 340. At block 350, an analog input signal, such as a signal from a process sensor (e.g., for temperature, pressure, light, voltage or other parameter), is converted to a digital signal. In one alternate implementation, the analog input signal is conditioned at block 350, prior to conversion to a digital signal, using an analog signal conditioner adapted to minimize aliasing at sampling frequencies greater than about 10 kHz. At block 360, the converted digital signal is oversampled, for example, using a sampling frequency of at least an order of magnitude greater than the maximum scan rate frequency of the PLC processor, as programmed with the filter parameters downloaded at block 330. In another alternate implementation, one of a plurality of digital finite impulse response (FIR) filters is selected and applied to the signal. After oversampling at block 360, the sampled signals are processed at block 370 using the programmed DSP, and the filtered signal is output at block 380. The output signal is optionally converted to an analog signal using a digital-to-analog (DAC) converter, depending upon the intended use of the signal.

Figure 4:
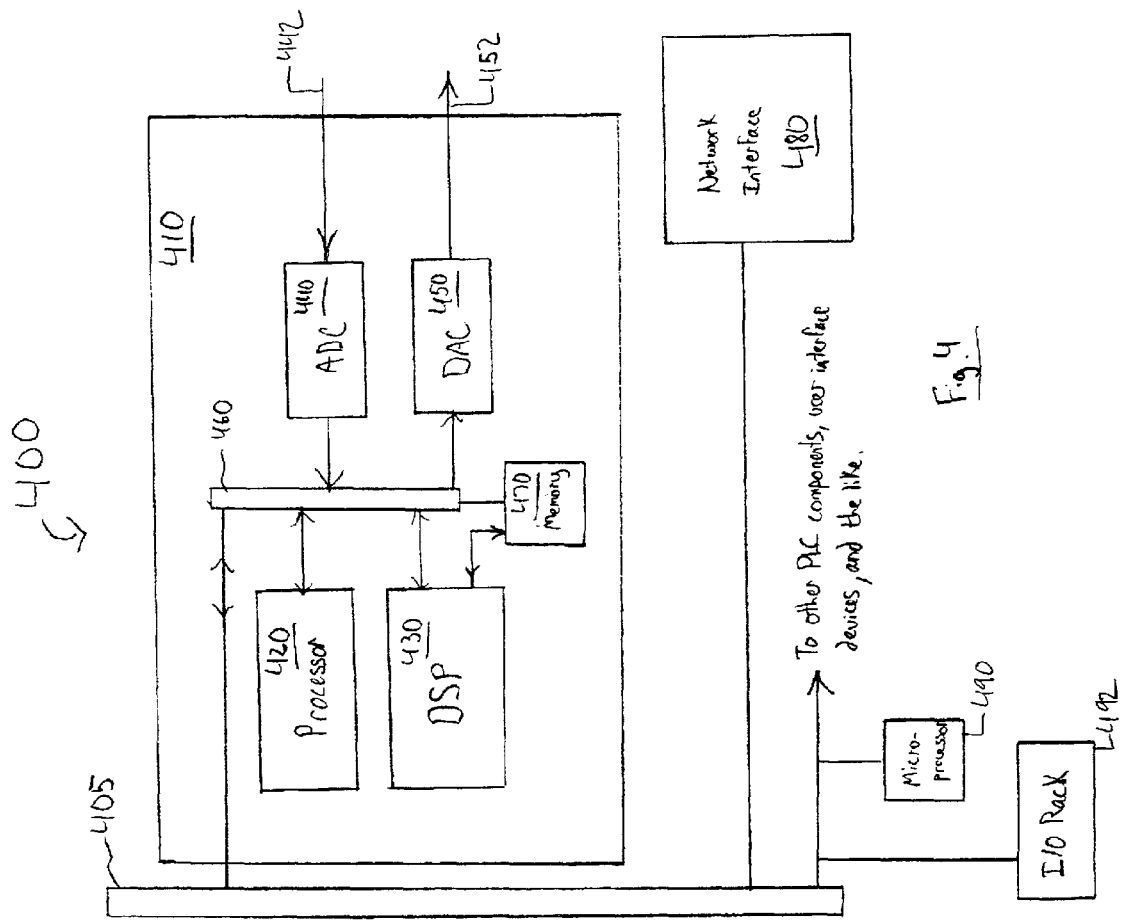
FIG. 4 is a PLC circuit arrangement for filtering a signal, according to another example embodiment of the present invention.

FIG. 4 is a block diagram of a PLC arrangement 400 with programmable DSP-based high-speed signal processing circuitry arranged for oversampling an analog signal, according to another example embodiment of the present invention. The PLC arrangement 400 includes a high-speed signal processing circuit board 410 that includes a microprocessor 420, a DSP 430, an ADC 440, a DAC 450, a memory 470 and a communications link 460 that is communicatively coupled to the communications link 405. The microprocessor 420 (e.g., a RISC microprocessor) is coupled to the communications link 460 and configured and arranged for controlling the operation of the components on the high-speed signal processing circuit board 410 using programming information stored at the memory 470 (e.g., a FLASH memory), which is also used by the DSP 430. The PLC arrangement 400 farther includes a communications link 405, such as a data bus, a network interface 480, a microprocessor 490 and an I/O module rack 492, with the PLC arrangement exhibiting a maximum scan rate for effecting input-process-output operations on signals received thereby.

The high-speed signal processing circuit board 410 is coupled to the PLC communications link 405, which in turn is coupled to other PLC components including the network interface 480, the microprocessor 490 and the I/O module rack 492. The network interface 480 is adapted for communicating PLC signal processing types (e.g., PLC-filtering types) to an external source and for receiving high-speed, near or at real-time signal processing parameters via the external source. The high-speed signal processing parameters received at the network interface 480 are communicated via communications links 405 and 460 to the high-speed signal processing circuit board 410, and in one implementation, are stored at the memory 470.

The representative blocks in the PLC arrangement 400 may include a variety of circuitry commonly used in signal processing, such as multiplier and accumulator circuitry, memory, addressing circuitry, sequencing circuitry and others. In addition, various ones of the illustrated components may be implemented in other arrangements, such as by moving the network interface device 480 onto the high-speed signal processing circuit board 410, incorporating the ADC 440 and/or the DAC 450 into the DSP 430, incorporating the microprocessor 420 and the DSP 430 as a single processor, moving the DAC output to an output on the PLC separate from the high-speed signal processing circuit board 410 and/or including the memory 470 with the PLC microprocessor 490. Furthermore, the PLC arrangement 400 may also be coupled to other PLC devices, user interfaces and network communications lines, as typically used in manufacturing applications, with one or more computers coupled to network communications lines coupled to a variety of PLC devices.

The DSP 430 can be implemented using one or more of a variety of commercially-available high-speed processors, such as a 68K series microprocessor available from Motorola, Inc., of Schaumburg, Ill., or a TMS series microprocessor available from Texas Instruments, Inc., of Dallas, Tex. Using such a high-speed processor, and with the microprocessor 420 controlling the component functions, data signals 442 input at the ADC 440 are converted to digital format and communicated over communications link 460 to the DSP 430. The data signals 442 are sampled at a rate that is greater than the maximum scan rate of the PLC microprocessor 490. Parameters stored at memory 470 are read by the DSP 430 and used for selecting signal processing aspects such as sampling rate, tap number and filtering coefficients used in particular filtering algorithms being performed. After the converted digital signal has been oversampled and processed, a digital output signal is provided to the DAC 450 via the communications link 460. The digital output signal is converted back to an analog signal at the DAC 450 and the converted analog signal 452 is output and used, for example, for process control. This high-speed signal processing approach with oversampling is particularly useful, for example, in filtering applications where conventional PLC applications aren't fast enough (e.g., wherein the maximum scan rate is not sufficient for performing selected complex filtering operations).

In one implementation, data filtered by the DSP 430 is recorded, with the PLC arrangement 400 being programmed to log data, graph data, and/or provide network-based alarms responsive to the data. For instance, when particular data exceeds a selected threshold, the PLC arrangement 400 alters the operation of a particular process for which the data is being processed. When used in connection with arc detection as referenced above, power to the arc can be terminated when arc count and/or arcing duration data exceeds a selected quantity per deposition threshold. This termination may be effected, for example, using one or more of a variety of components coupled to the PLC arrangement 400, such as an electrical solenoid or other component that terminates power or otherwise delivers a signal to the arc controller to terminate the arc process. With other applications, such as motion control or temperature control, signal inputs, such as motion signals or heat supply (e.g., gas valve actuation or power input) signal, can be altered and/or terminated in response to selected thresholds being met or other characteristics of the filtered signal. In addition, a variety of other real-time analysis of process data can be performed using the approaches discussed herein.

The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such changes may include, but are not necessarily limited to: altering the types of interfaces used to download high-speed signal processing coefficients, altering the coefficients and other programmed high-speed signal processing characteristics and interchanging the various types of processes. Such modifications and changes do not depart from the true spirit and scope of the present invention that is set forth in the following claims.

What is claimed is:

1. A programmable logic controller (PLC) arrangement comprising:
   a plurality of input/output nodes;
   a programmable PLC-processor circuit adapted to control the PLC in response to user-defined tasks and to provide an input-process-output cycle in which input signals at the nodes are scanned and processed to provide an output at the nodes, the input-process-output cycle being repeated at a rate that does not exceed a maximum scan rate; and
   programmable signal processing circuitry including a digital signal processor (DSP) circuit, the programmable signal processing circuitry being configured and arranged to oversample and process the input signals at the nodes.

2. The PLC arrangement of claim 1, wherein the programmable signal processing circuitry is further configured and arranged to oversample and process the input signals at the nodes at least twice as fast as the maximum scan rate and to provide an output to the programmable PLC-processor circuit that is a function of the oversampled and processed input signals.

3. The PLC arrangement of claim 2, wherein the programmable signal processing circuitry is configured and arranged to oversample the input signal at a sampling frequency of at least about 10 kHz.

4. A programmable logic controller (PLC) arrangement comprising:
   a plurality of input/output nodes;
   a programmable PLC-processor circuit adapted to control the PLC in response to user-defined tasks and to provide an input-process-output cycle in which input signals at the nodes are scanned and processed to provide an output at the nodes, the input-process-output cycle being repeated at a rate that does not exceed a maximum scan rate;
   programmable signal processor circuitry including a digital signal processor (DSP) circuit and a microprocessor;
   the programmable signal processing circuitry being configured and arranged to oversample and process the input signals at the nodes at least twice as fast as the maximum scan rate and to provide an output to the programmable PLC-processor circuit that is a function of the oversampled and processed input signals; and
   the microprocessor being configured and arranged for programming with at least one downloaded signal processing parameter for controlling the oversampling and processing of the input signals, the at least one downloaded signal processing parameter being downloaded and programmed via the PLC-processor circuit.

5. The PLC arrangement of claim 4, wherein the microprocessor is configured and arranged for programming via downloaded filtering parameters including at least one of: filtering coefficients, sampling rates and tap numbers.

6. The PLC arrangement of claim 4, further comprising:
   a programming register coupled to the programmable signal processing circuitry and configured and arranged for receiving and storing the at least one downloaded signal processing parameter for use by the programmable signal processing circuitry.

7. The PLC arrangement of claim 4, further comprising an interface device configured and arranged for communicating with an external source to download the at least one downloaded signal processing parameter from the external source and for communicating the at least one downloaded signal processing parameter to the signal processing circuitry.

8. The PLC arrangement of claim 7, wherein the interface device is configured and arranged for communicating with the external source via a serial communications link.

9. The PLC arrangement of claim 7, wherein the interface device is configured and arranged for communicating with the external source via a network-based communications link.

10. The PLC arrangement of claim 7, wherein the interface device is configured and arranged for communicating with the external source via the Internet.

11. The PLC arrangement of claim 10, wherein the external source includes a server accessible via a website and wherein the interface device is configured and arranged to communicate a request to the website for effecting a selected type of signal processing and to download the at least one downloaded signal processing parameter from the website, the at least one downloaded signal processing parameter being provided in response to the communicated request.

12. A PLC-based system comprising:
   a plurality of input/output nodes configured and arranged for receiving at least one analog signal;
   a programmable PLC-processor circuit adapted to control the PLC in response to user-defined tasks and to provide an input-process-output cycle in which input signals at the nodes are scanned and processed to provide an output at the nodes, the input-process-output cycle being repeated at a rate that does not exceed a maximum scan rate;
   a programming input node configured and arranged to communicate with an external source for receiving at least one high-speed signal processing parameter from an external source;
   an analog-to-digital converter (ADC) coupled to at least one of the plurality of input/output nodes and configured and arranged for converting the at least one analog signal to a digital signal; and
   programmable signal processing circuitry coupled to the ADC and to the programming input node and including a digital signal processor (DSP) circuit, the programmable signal processing circuitry being configured and arranged to oversample and process the converted digital signal and to provide an output signal as a function of the oversampled and processed converted digital signal and the at least one high-speed signal processing parameter.

13. The PLC-based system of claim 12, wherein the programmable signal processing circuitry includes the ADC.

14. The PLC-based system of claim 13, wherein the programmable PLC-processing circuit has a microprocessor and wherein the programmable signal processing circuitry is disposed on a signal processing card coupled to the microprocessor via a communications link.

15. The PLC-based system of claim 12, wherein the programming input node includes a network access appliance communicatively coupled to the external source via a first communications link and communicatively coupled to the programmable signal processing circuitry via a second communications link.

16. A method for high-speed signal processing with a PLC-based arrangement having a maximum scan rate for repeating an input-process-output cycle in which input signals are scanned and processed to provide an output, the method comprising:

programming a signal processing circuit with signal processing parameters;

oversampling and processing an input signal, using the programmed signal processing parameters, at a rate that is at least twice as fast as said maximum scan rate and;

outputting the processed oversampled and processed input signal to a PLC processor.

17. The method of claim 16, wherein oversampling and processing an input signal includes using a DSP to oversample and process the input signal.

18. The method of claim 16, wherein sampling and processing an input signal at a rate that is at least twice as fast as said maximum scan rate includes oversampling and processing the input signal at a frequency that exceeds 10 kHz.

19. A method for high-speed signal processing with a PLC-based arrangement having a maximum scan rate for repeating an input-process-output cycle in which input signals are scanned and processed to provide an output, the method comprising:

accessing a remote web site via the Internet and sending a signal processing type request to the remote web site;

downloading signal processing parameters in response to the signal processing type request;

programming a signal processing circuit with signal processing parameters including the downloaded signal processing parameters; and oversampling and processing an input signal, using the programmed signal processing parameters at a rate that is at least twice as fast as said maximum scan rate.

\* \* \* \* \*